(12) United States Patent
Vincens et al.

(10) Patent No.: US 9,791,124 B2
(45) Date of Patent: Oct. 17, 2017

(54) VEHICLE LIGHTING ASSEMBLY AND METHOD FOR ACHIEVING YELLOW COLORED TURN SIGNALS

(71) Applicant: MLS Automotive, Inc., Farmington Hills, MI (US)

(72) Inventors: Adam J. Vincens, Plymouth, MI (US); Favian de Lima, Farmington Hills, MI (US)

(73) Assignee: MLS Automotive, Inc., Farmington Hills, MI (US)

( * ) Notice: Subject to any disclaimer, the term of this patent is extended or adjusted under 35 U.S.C. 154(b) by 0 days.

(21) Appl. No.: 15/439,342

(22) Filed: Feb. 22, 2017

(65) Prior Publication Data

US 2017/0241614 A1 Aug. 24, 2017

Related U.S. Application Data

(60) Provisional application No. 62/298,725, filed on Feb. 23, 2016.

(51) Int. Cl.

| | |
|---|---|
| *F21V 11/00* | (2015.01) |
| *F21S 8/10* | (2006.01) |
| *B60Q 1/34* | (2006.01) |
| *B60Q 1/44* | (2006.01) |
| *F21Y 115/10* | (2016.01) |
| *F21Y 113/13* | (2016.01) |

(52) U.S. Cl.
CPC ............ *F21S 48/2218* (2013.01); *B60Q 1/34* (2013.01); *B60Q 1/44* (2013.01); *F21S 48/211* (2013.01); *F21S 48/215* (2013.01); *F21S 48/234* (2013.01); *F21Y 2113/13* (2016.08); *F21Y 2115/10* (2016.08)

(58) Field of Classification Search
CPC .... F21S 48/2218; F21S 48/215; F21S 48/211; F21S 48/234; B60Q 1/34; B60Q 1/44; F21Y 2115/10; F21Y 2113/13
USPC ........................................................ 362/510
See application file for complete search history.

(56) References Cited

U.S. PATENT DOCUMENTS

| | | | |
|---|---|---|---|
| 5,200,855 | A | 4/1993 | Meredith et al. |
| 5,803,579 | A | 9/1998 | Turnbull et al. |
| 7,095,334 | B2 | 8/2006 | Pederson |
| 7,168,834 | B2 | 1/2007 | Takeda et al. |
| 7,278,762 | B2 | 10/2007 | Schottland et al. |
| 7,963,665 | B2 | 6/2011 | Minoda et al. |
| 8,016,468 | B2 | 9/2011 | Tessnow et al. |
| 8,057,081 | B2 | 11/2011 | Schwab |

(Continued)

FOREIGN PATENT DOCUMENTS

| | | |
|---|---|---|
| EP | 0 725 286 A1 | 8/1996 |
| WO | WO-99/00623 | 1/1999 |

*Primary Examiner* — Elmito Breval
*Assistant Examiner* — Hana Featherly
(74) *Attorney, Agent, or Firm* — Foley & Lardner LLP

(57) ABSTRACT

A vehicle lighting assembly includes a housing, a circuit board, and a lens. The circuit board is disposed within the housing and includes a turn signal light source configured to emit yellow-green colored light at a peak intensity in a range of about 500 nm to about 570 nm. The lens is coupled to the housing. The lens is a single-color optical filter configured to shift the yellow-green colored light emitted from the turn signal light source to a range of about 588 nm to about 592 nm.

18 Claims, 8 Drawing Sheets

(56) References Cited

U.S. PATENT DOCUMENTS

| | | | |
|---|---|---|---|
| 8,142,060 B2 | 3/2012 | Saida et al. | |
| 8,274,208 B2 | 9/2012 | Miyake et al. | |
| 8,299,487 B2 | 10/2012 | Daicho et al. | |
| 8,585,273 B2 | 11/2013 | Pokrovskiy et al. | |
| 9,103,520 B1 | 8/2015 | Tessnow et al. | |
| 2009/0034292 A1* | 2/2009 | Pokrovskiy | G02B 6/0028 362/617 |
| 2010/0188301 A1* | 7/2010 | Kishimoto | G08G 1/095 343/721 |
| 2014/0268852 A1* | 9/2014 | Foley | F21S 48/00 362/520 |
| 2015/0311402 A1* | 10/2015 | van de Ven | H01L 33/44 257/98 |

\* cited by examiner

VEHICLE LIGHTING ASSEMBLY AND METHOD FOR ACHIEVING YELLOW COLORED TURN SIGNALS

CROSS-REFERENCE TO RELATED PATENT APPLICATIONS

This application claims the benefit of and priority to U.S. Provisional Application No. 62/298,725, filed Feb. 23, 2016, the entire disclosure of which is hereby incorporated by reference herein.

BACKGROUND

The present application relates generally to lighting assemblies. In particular, the present application relates to a vehicle lighting assembly and a method for achieving yellow colored turn signals or vehicle hazard lights.

SUMMARY

One embodiment of the present application relates to a vehicle lighting assembly including a housing, a circuit board, and a lens. The circuit board is disposed within the housing and includes a turn signal light source configured to emit yellow-green colored light at a peak intensity in a range of about 500 nm to about 570 nm. The lens is coupled to the housing. The lens is a single-color optical filter configured to shift the yellow-green colored light emitted from the turn signal light source to a range of about 588 nm to about 592 nm.

Another embodiment relates to a method of illuminating a vehicle lighting assembly. The method includes emitting yellow-green colored light at a peak intensity in a range of about 500 nm to about 570 nm from a turn signal light source coupled to a circuit board of the vehicle lighting assembly. The method further includes filtering the yellow-green colored light through a single-color optical filter to shift the yellow-green colored light emitted from the turn signal light source to a range of about 588 nm to about 592 nm.

Another embodiment relates to a vehicle taillight assembly including a housing, a circuit board, and a single-color optical filter. The circuit board is disposed within the housing, and includes a turn signal light source configured to emit yellow-green colored light at a peak intensity in a range of about 500 nm to about 570 nm and a brake light source configured to emit red colored light at a peak intensity in a range of about 612 nm to about 630 nm. The single-color optical filter is coupled to the housing and is configured to shift the yellow-green colored light emitted from the turn signal light source to a range of about 588 nm to about 592 nm through the filter, and allow the red colored light emitted from the brake light source to pass through the filter without a substantial shift in color.

DETAILED DESCRIPTION

Figure 1:
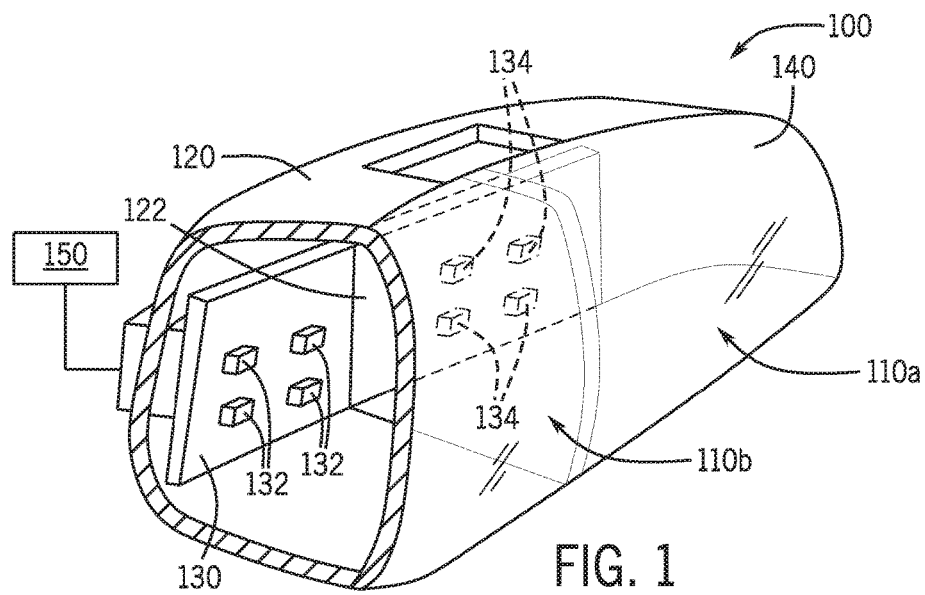
FIG. 1 is a partial perspective view of a vehicle taillight assembly according to an exemplary embodiment.

Generally speaking, Federal Motor Vehicle Safety Standard 108 (FMVSS) and SAE J578 provide that automotive rear turn signals or indicators and flashing "hazard" lights for the rear of a motor vehicle (e.g., a passenger car less than 80 inches in overall width, heavy duty truck, motorcycle, etc.) be "red" in color or "yellow" in color (often described as "amber"). The United Nations Economic Commission for Europe (UNECE) automotive regulations requires automotive rear turn signals to be "yellow" in color, and soon the U.S. National Highway and Traffic Safety Administration (NHTSA) may grant additional safety points within the 5-Star New Car Assessment Program for vehicles in the United States that include "yellow" colored rear turn signals, as there have been studies that have shown improved human reaction time in response to brake signals that contrast with turn signals (e.g., yellow color versus red color) (see, for example, 78558 Federal Register, Vol. 80, No. 241, Dec. 16, 2015).

The majority of vehicles for sale in North America have used "red" colored rear turn signals due, in part, to the higher photometric requirements for "yellow" versus "red" colors, the technology available in 1968 when the safety standard was first written, and current styling requirements for vehicles. Adding a third color (e.g., yellow, etc.) to an outer lens of a taillight assembly as an additional color filter to achieve yellow colored light would add substantial cost and complexity to the manufacturing of a lighting assembly. For example, the cost of tooling will increase if an additional material color is added to an injection molded lens to achieve, for example, a lens including separate yellow, red, and/or clear portions (e.g., by adding multiple material "shots" during the molding process, etc.). Furthermore, having a taillight lens that is multi-colored may be undesirable from a vehicle styling perspective, as many carmakers have demonstrated a trend toward taillight assemblies that utilize a single-color lens (e.g., red, etc.).

Additionally, using AlInGaP type yellow colored LEDs to achieve yellow colored rear turn signals or hazard lights presents a challenge to comply with the photometric requirements of the safety standard. For example, AlInGaP type yellow colored LEDs may require selective color binning or sorting to achieve the proper photometric requirements of the SAE standard (e.g., color, intensity, etc.), which can add significant cost to the lighting assembly. Furthermore, AlInGaP type yellow colored LEDs generally have a lower luminous intensity and reduced stability as compared to other types of LEDs (e.g., InGaN type yellow-green colored LEDs, etc.).

Thus, it would be advantageous to provide a lower cost lighting assembly that complies with the photometric requirements of the safety standard without increasing component count, cost of tooling, or part complexity, and that meets current styling trends for vehicle lighting assemblies that utilize a single-color lens, while producing both red color brake/taillight functions and yellow color turn signal/hazard functions.

Referring generally to the FIGURES, disclosed herein is a vehicle lighting assembly and method for providing a yellow colored rear turn signal that meets the yellow color requirements for emitted light defined by automotive safety standard SAE J578, while still meeting the red color material requirements for lenses defined by safety standard SAE J576 using an appropriate light source. The disclosed lighting assembly can also provide rear brake (stop) and taillight (rear position) illumination that meets the red color requirements for emitted light also defined by SAE J578.

According to an exemplary embodiment, the assembly includes a lens (e.g., optical filter, etc.) in combination with one or more "yellow-green" colored LEDs to provide filtered light having a color that falls within the color boundaries defined by SAE J578. Furthermore, the lens itself is of a single color that meets the material requirements of SAE J576. The lens also has appropriate light transmission properties so as not to substantially shift the color spectrum of red colored light emitted through the lens for other vehicle functions (e.g., tail lights, brake lights, etc.), so as to comply with the red color light requirements of SAE J578. In this manner, the assembly and method disclosed herein achieves the required yellow color for emitted light defined by SAE J578 without the need for an additional filter or more costly LEDs (e.g., yellow, etc.), thereby reducing component cost and part complexity. Additionally, the disclosed lighting assembly can, advantageously, reduce the overall cost to domestic automakers who export their vehicles to markets that require yellow colored turn signals (e.g., UN ECE and CCC markets, etc.).

FIG. 1 illustrates a vehicle lighting assembly, shown as a vehicle taillight assembly 100 according to an exemplary embodiment. As shown in FIG. 1, the taillight assembly 100 includes a brake and taillight portion 110a and a turn signal portion 110b. The taillight assembly 100 is configured to provide exterior lighting for an automotive vehicle, such as a passenger car or truck, although the taillight assembly 100 may be configured for use in other types of vehicles, such as buses, motorcycles, RVs, boats, heavy duty equipment, or other motorized or non-motorized vehicles.

According to another exemplary embodiment, the lighting assembly is configured for use as a traffic signal where red and yellow colored light is emitted. For example, the red signal (i.e., "stop" signal) and the yellow signal (i.e., "slow" or "caution" signal) of a conventional traffic light, which are typically separate and distinct from each other, can be combined into a single signal or subassembly using a single colored filter (e.g., a red colored lens, etc.) and one or more colored light sources (e.g., yellow-green colored LEDs, etc.) to meet the emitted light requirements for both the red and yellow signal functions. In this way, the lighting assembly can reduce component count and overall cost to manufacture the traffic signal.

Still referring to the exemplary embodiment of FIG. 1, the taillight assembly 100 includes a housing 120, a circuit board 130, a lens 140, and a controller 150. The circuit board 130 is disposed within the housing 120, and the lens 140 is coupled to or integrally formed with the housing 120. The circuit board 130 can include one or more turn signal light sources 132 coupled thereto, and one or more brake/taillight sources 134 coupled thereto. The turn signal light sources 132 and the brake/taillight sources 134 are electrically coupled to the circuit board 130, which is operatively coupled to the controller 150. The controller 150 can be operatively coupled to a vehicle controller and/or headlamp switch to provide, for example, electrical current to illuminate the turn signal light sources 132 and/or the brake/taillight sources 134, to thereby provide exterior lighting through the lens 140 of the taillight assembly 100. The lens 140 can, advantageously, shift the color of emitted light from the turn signal light sources 132 to achieve the required yellow color defined by SAE J578. The lens 140 can also allow the light emitted from the brake/taillight sources 134 to pass through the lens 140 without a substantial shift in color.

For example, the turn signal light sources 132 can illuminate the turn signal portion 110b of the taillight assembly 100, and the brake/taillight sources 134 can illuminate the brake and taillight portion 110a of the taillight assembly 100. A partition 122 or other internal structure of the housing 120 can separate the turn signal light sources 132 from the brake/taillight sources 134, so as to prevent emitting light from the turn signal light sources 132 through the brake and taillight portion 110a, and from the brake/taillight sources 134 through the turn signal portion 110b. In this way, the partition 122 can define the taillight portion 110a and the turn signal portion 110b of the taillight assembly 100.

Figure 2:
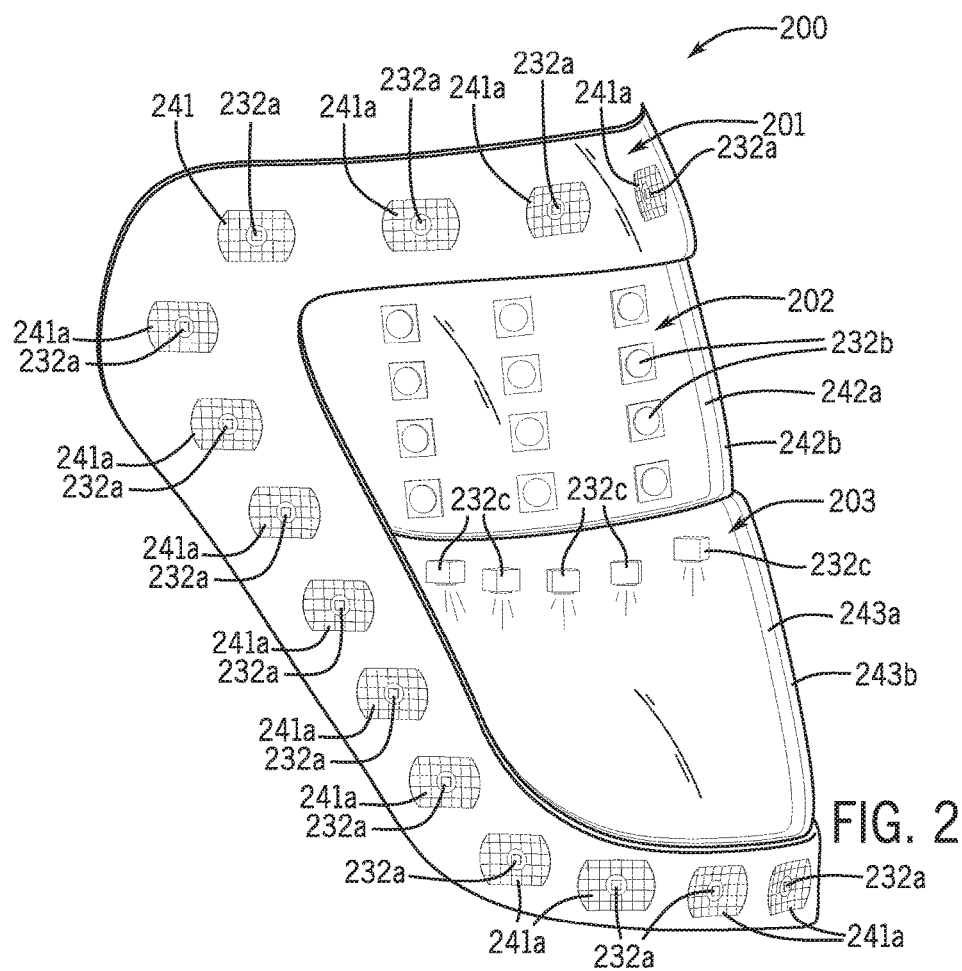
FIG. 2 is a perspective view of a vehicle taillight assembly including various lens and LED array configurations according to various exemplary embodiments.
Figure 3:
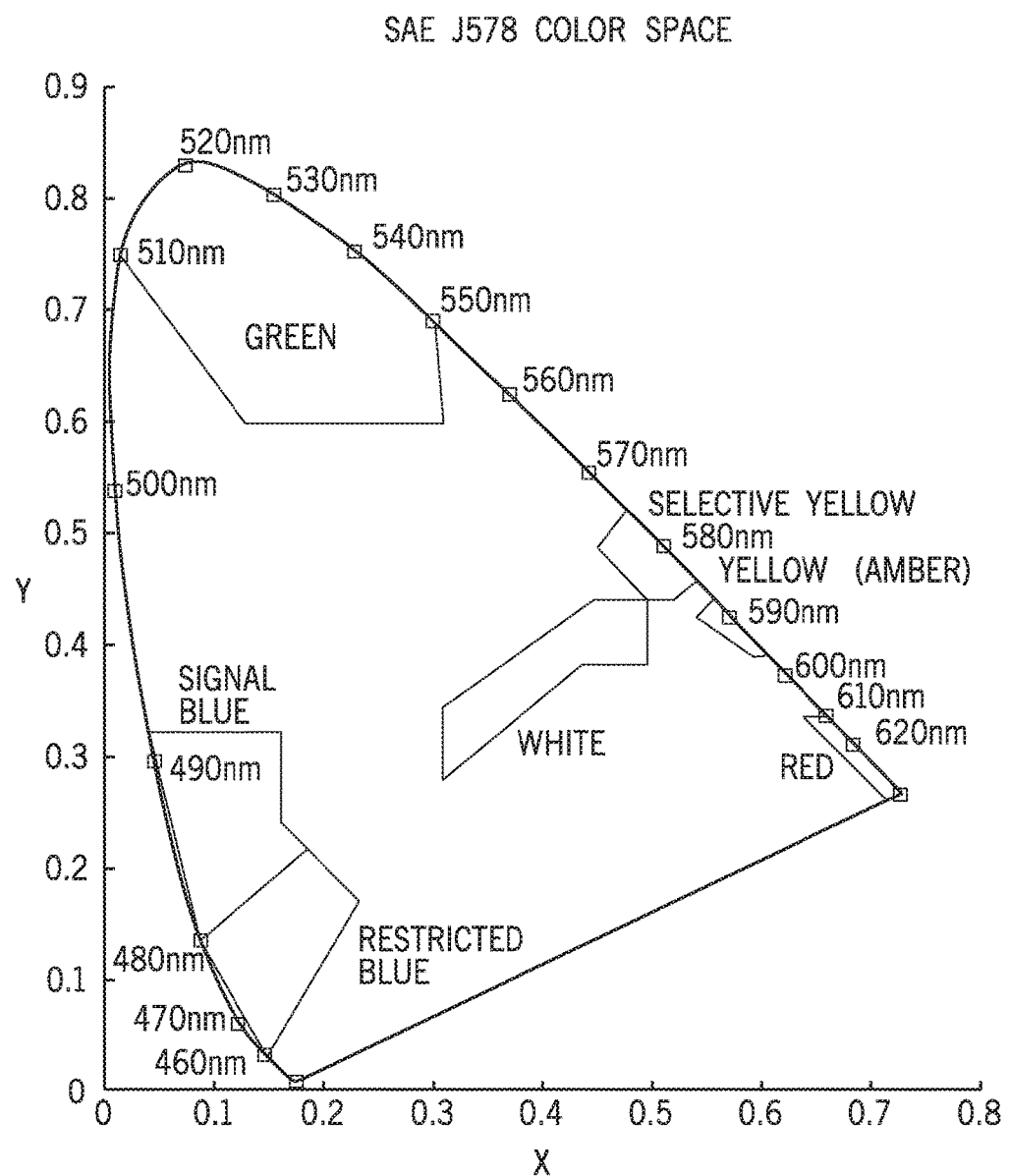
FIG. 3 illustrates a CIE 1931 xy chromaticity plot and an SAE J578 color boundary plot.

Referring to FIG. 2, a taillight assembly 200 is shown according to another exemplary embodiment. The taillight assembly 200 is similar to the taillight assembly 100 of FIG. 1, but is shown to include three different configurations of lenses and light source arrays, according to various exemplary embodiments. The various lens configurations and light source arrays shown in FIG. 2 can be applied to the taillight assembly 100, according to various exemplary embodiments. Furthermore, the various lenses shown in FIG. 2 can function as the lens 140 of FIG. 1 to shift the color of emitted light from the turn signal light sources 132 to achieve the required yellow color defined by SAE J578. The various lenses in the embodiment of FIG. 2 can also function to allow the light emitted from the brake/taillight sources 134 to pass through without a substantial shift or zero shift in color.

As shown in FIG. 2, the taillight assembly 200 includes a first lens configuration 201, a second lens configuration 202, and a third lens configuration 203. The first lens configuration 201 is a "direct-view reflector" type lens. The first lens configuration 201 includes a lens 241 and a plurality of turn signal light sources 232a, shown as LEDs, disposed directly behind the lens 241. The lens 241 can include a plurality of reflecting portions 241a that correspond to each of the turn signal light sources 232a. The plurality of reflecting portions 241a of the lens can function to distribute the direct light emitted by the turn signal light sources 232a to an exterior of the lens. According to an exemplary embodiment, the reflecting portions 241a can be textured surfaces or features that are molded into the lens 241.

Still referring to FIG. 2, the second lens configuration 202 is a "direct-view" type lens. In this embodiment, the second lens configuration 202 includes an inner lens 242a (e.g., film, screen, etc.) and an outer lens 242b. The outer lens 242b is disposed over the inner lens 242a. The inner lens 242a can function as a color filter for shifting the color of emitted light from one or more turn signal light sources 232b, shown as LEDs, disposed directly behind the inner lens 242a. The outer lens 242b can be substantially transparent (i.e., clear), so as to allow the shifted light from the inner lens 242a to pass through the outer lens without substantial shift or zero shift in color. The third lens configuration 203 is similar to the second lens configuration 202, but includes one or more turn signal light sources 232c that are oriented to emit light indirectly (e.g., perpendicular to the lens, etc.) relative to an inner lens 243a (e.g., film, screen, etc.) and an outer lens 243b. The inner lens 243a can function as a color filter for shifting the color of emitted light from one or more turn signal light sources 232c.

Figure 8:
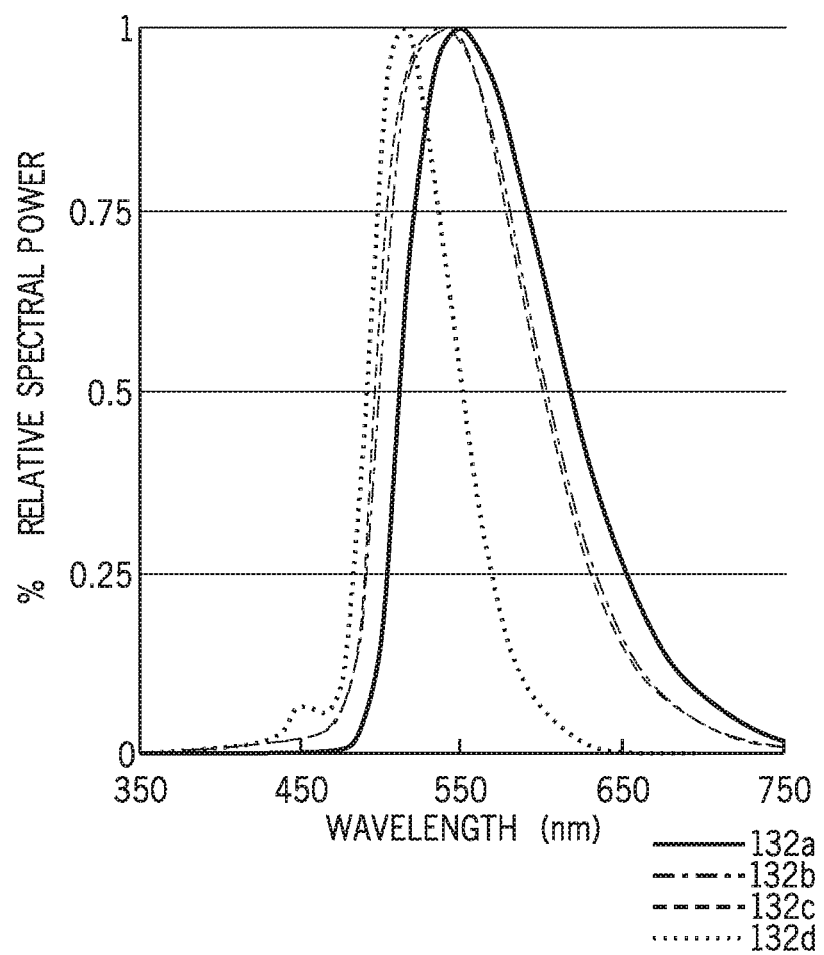
FIG. 8 is a graph illustrating the transmittance and relative wavelengths for various yellow-green colored LEDs for use in the lighting assembly of FIG. 1 according to various exemplary embodiments.

According to the exemplary embodiments of FIGS. 1 and 2, the turn signal light sources 132 and 232a-232c emit "yellow-green" colored light. As used herein, "yellow-green" colored light means visible light with relative intensity peaks at wavelengths in a range of about 500 nm to about 560 nm of the electromagnetic radiation spectrum. According to an exemplary embodiment, the turn signal light sources are InGaN type LEDs that can provide yellow-green colored light. For example, FIG. 8 illustrates the relative spectral power versus relative wavelength (i.e., emission spectra) for four different yellow-green InGaN type LEDs 132a-132d that can be used as a turn signal light source in the taillight assemblies 100 and 200, according to various exemplary embodiments. As shown in FIG. 8, each of the yellow-green LEDs 132a-132d has a peak intensity at wavelengths in a range of about 500 nm to about 560 nm, respectively. According to other exemplary embodiments, the turn signal light sources are another type of LED or light source capable of providing yellow-green colored light.

Figure 5:
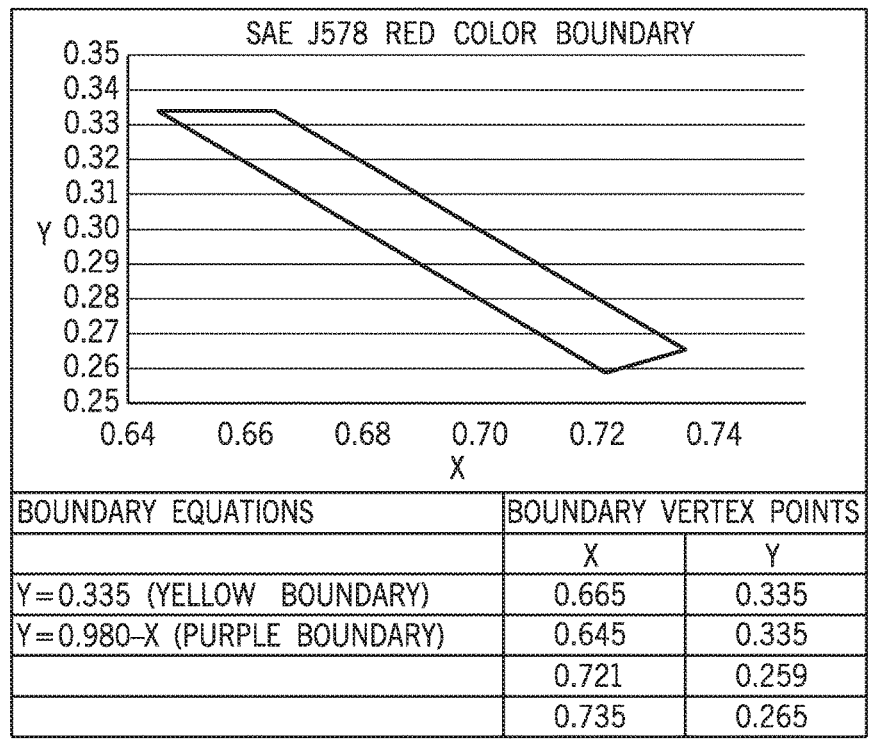
FIG. 5 is a color boundary plot and table illustrating boundary equations and vertices for SAE J578 red color values.

According to an exemplary embodiment, the brake/taillight sources 134 of the taillight assembly 100 emit "red" colored light. As used herein, "red" colored light means visible light with relative intensity peaks at wavelengths in a range of about 612 nm to about 630 nm, which fall within the red color boundaries defined by SAE J578, as illustrated in FIG. 5. According to various exemplary embodiments, the brake/taillight sources 134 can be LEDs, incandescent bulbs, or any other light source capable of emitting red colored light sufficient to meet the red color requirements for exterior brake and taillight functions set forth in SAE J578.

Referring to FIGS. 1-7, the lenses 140, 241, 242a, and 243a are each a "single-color optical filter" that can meet the material requirements defined by SAE J576 and the emitted color light requirements defined by SAE J578. As used herein, "single-color optical filter" means a filter (e.g., lens, film, etc.) having a single color (e.g., red, etc.) that meets the material requirements of SAE J576, and having a defined range of transmission properties to meet both the yellow color requirements for turn signal function defined by SAE J578 (using a yellow-green colored light source), and the red color requirements for brake/taillight functions defined by SAE J578 (using a red colored light source).

Figure 4:
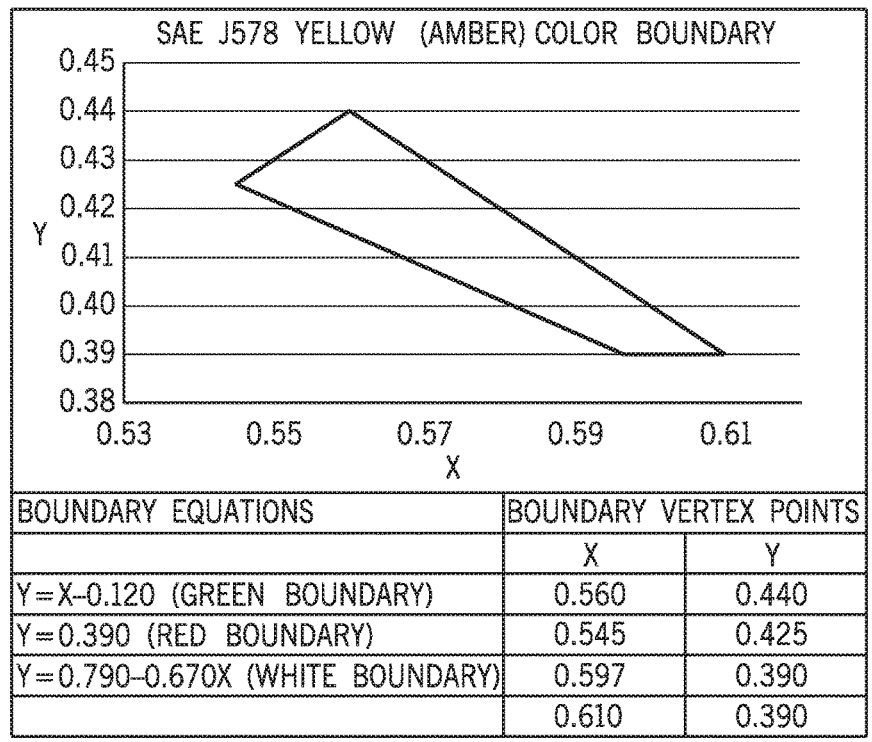
FIG. 4 is a color boundary plot and table illustrating boundary lines and vertices for SAE J578 yellow color values.

For example, the yellow-green light emitted from the turn signal light sources 132 and 232a-232c can be filtered (e.g., shifted, etc.) through the lenses 140, 241, 242a, and 243a to achieve the required yellow color for turn signal or hazard functions defined by SAE J578, which is illustrated in FIG. 4. The yellow-green colored light transmitted through the lens (e.g., through lens 140 at turn signal portion 110b, etc.) is shifted by the lens, and the peak of the emitted spectrum falls within a range of about 588 nm to about 592 nm, so as to comply with the yellow color requirements set forth in SAE J578. That is to say, the xy chromaticity value of the measured color of emitted light through the lens at a peak intensity of the turn signal light sources falls within the yellow color boundaries defined by SAE J578 and FMVSS 108, as defined by the following boundary equations:

$$y=0.39 \text{ (red boundary)}$$

$$y=0.79-0.67x \text{ (white boundary)}$$

$$y=x-0.12 \text{ (green boundary)}$$

The red colored light emitted from the brake/taillight sources 134 can be transmitted or passed through the lens (e.g., through lens 140 at brake and taillight portion 110a, etc.) without a substantial shift (i.e., imperceptible to the human eye) or zero shift in color to also meet the required red color for brake/taillight functions defined by SAE J578, which is illustrated in FIG. 5. In other words, the xy chromaticity value of the measured color of light transmitted through the lens at a peak intensity of the brake/taillight sources 134 falls within the red color boundaries defined by SAE J578 and FMVSS 108. The lenses 140, 241, 242a, and 243a also have a single color (e.g., red, etc.) that complies with the material requirements of SAE J576. In this manner, the lenses 140, 241, 242a, and 243a can each act as a single-color optical filter to eliminate the need for an additional filter or material in the lens to achieve the required yellow color for rear turn signal function and the required red color for brake/taillight function.

Figure 9:
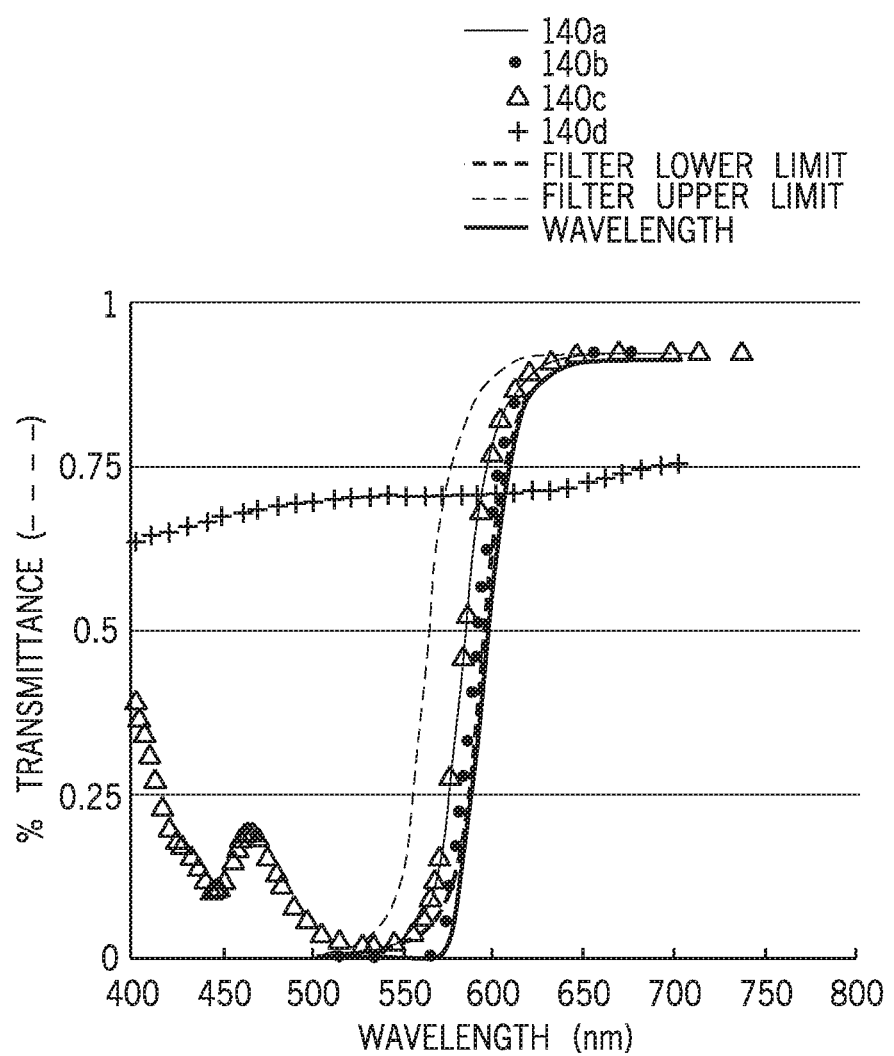
FIG. 9 is a graph illustrating the transmittance and relative wavelengths for various single-color optical filters for use in the lighting assembly of FIG. 1 according to various exemplary embodiments.

FIG. 9 illustrates the percent transmission and relative wavelengths for four different color filters 140a-140d that can be used as a lens in the taillight assemblies 100 and 200, according to various exemplary embodiments. The color filters 140a-140d each have a relative transmittance to wavelength value sufficient to act as a single-color optical filter in the taillight assemblies 100 and 200.

Figure 6:
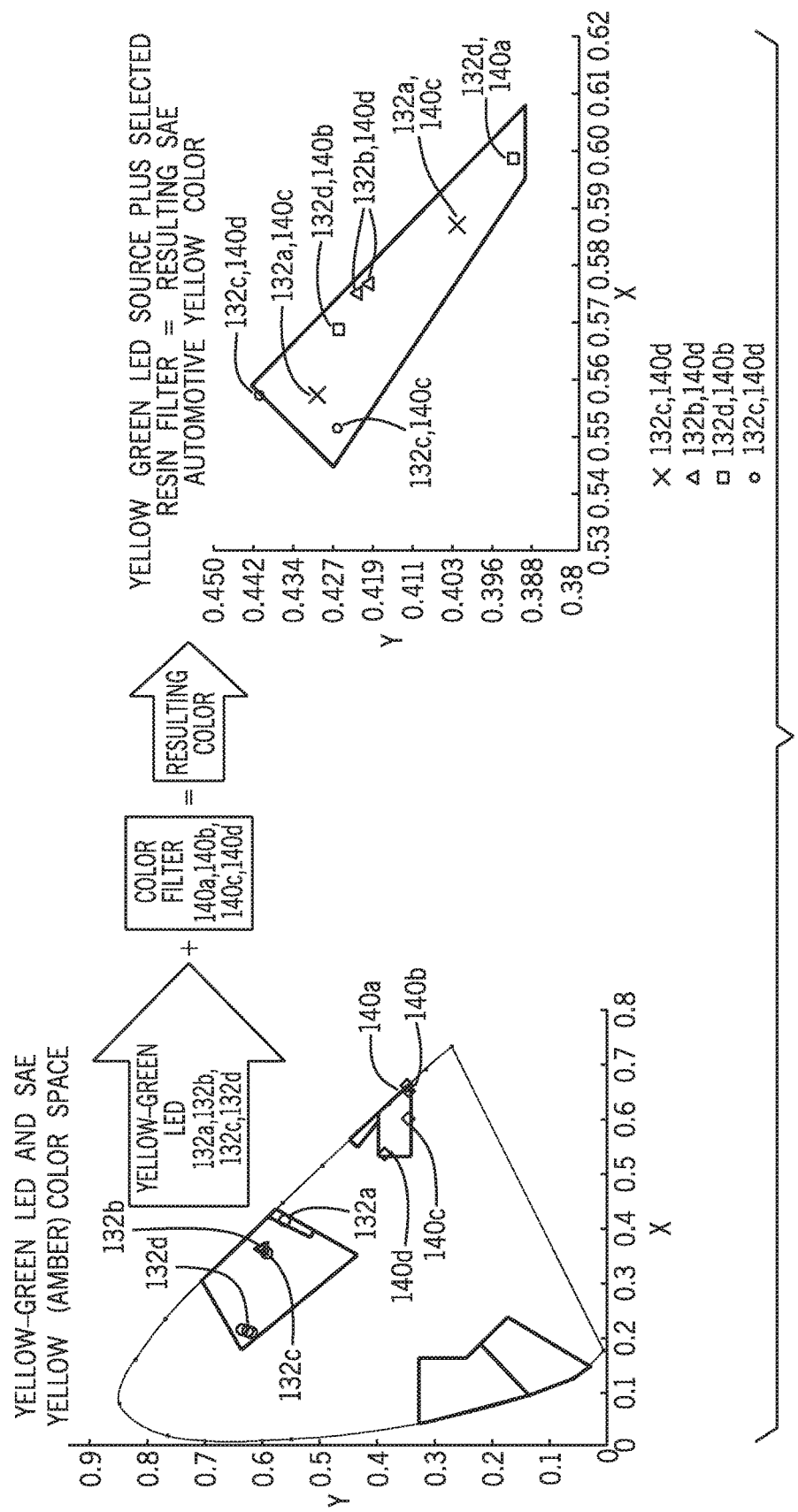
FIG. 6 is a schematic illustration of the color shift achieved by a yellow-green colored light source and a single-color optical filter to achieve yellow color falling in the boundaries defined by SAE J578 according to various exemplary embodiments.
Figure 7:
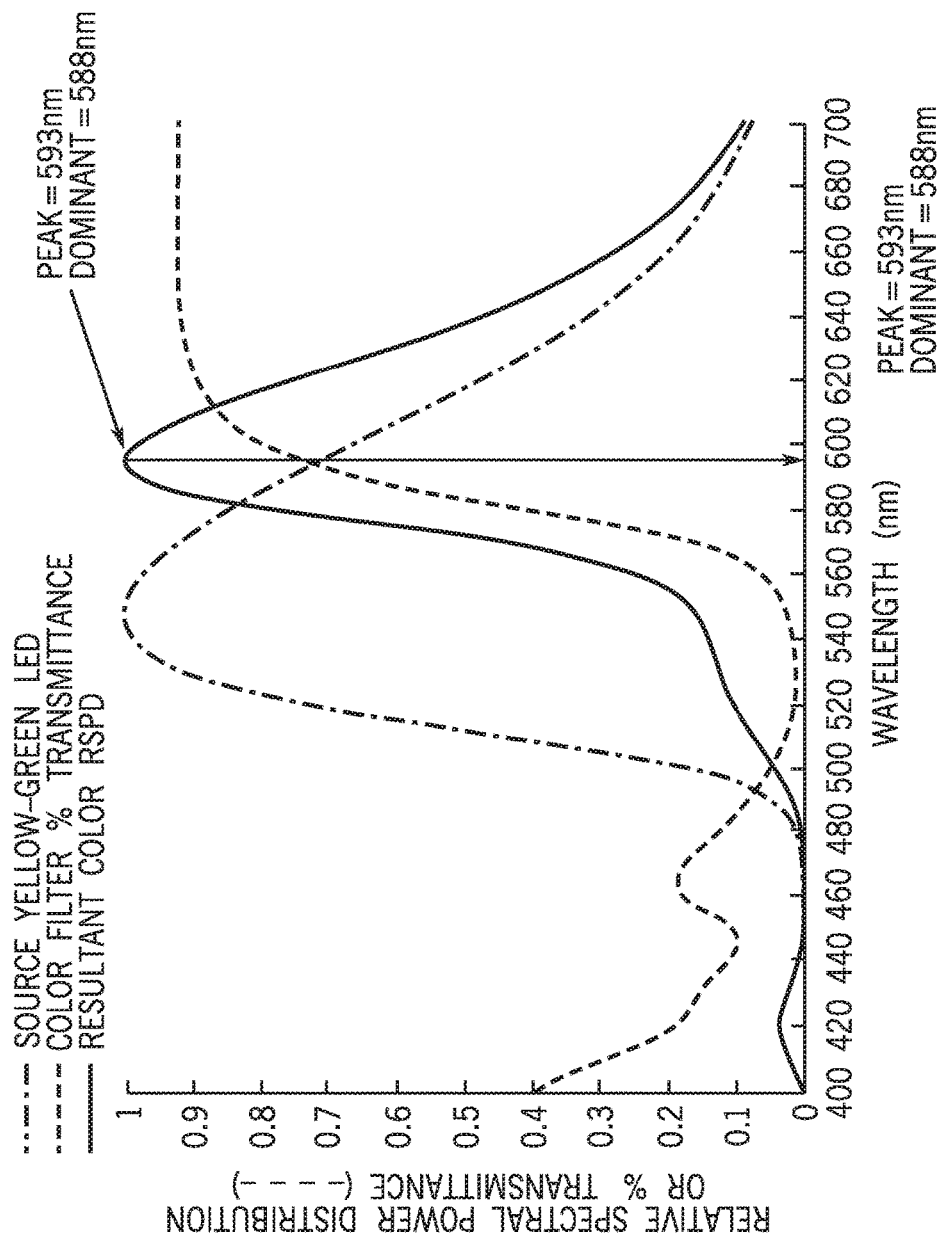
FIG. 7 is a graph illustrating a targeted relative spectral power distribution for a yellow-green colored light source and a single-color optical filter suitable for use in producing a yellow colored turn signal.

For example, referring to FIG. 6, the yellow-green LEDs 132a-132d shown in FIG. 8 were combined with the color filters 140a-140d of FIG. 9 to achieve yellow colored light emitted from the filters that meets the SAE J578 requirement for yellow colored light. As shown in FIG. 6, yellow-green LED 132a was combined with two color filters 140c having thicknesses of about 1 mm and about 2.5 mm, respectively. The resulting color of the emitted light through each of the color filters 140c at peak intensities of the yellow-green LED 132a fell within the yellow boundaries defined by SAE J578, as illustrated in the plot on the right side of FIG. 6. Similarly, yellow-green LED 132b was combined with two color filters 140d having thicknesses of about 2.0 mm and about 3.0 mm, respectively. The resulting color of the emitted light at peak intensities of the yellow-green LED 132b through each of the color filters 140d fell within the yellow boundaries defined by SAE J578. Yellow-green LED 132c was combined with color filter 140c having a thickness of about 2.0 mm, and color filter 140d having a thickness of about 3.0 mm. As shown in FIG. 6, the resulting color emitted at peak intensities of the yellow-green LED 132c through each of the color filters 140c and 140d fell within the yellow color boundaries defined by SAE J578. Lastly, yellow-green LED 132d was combined with color filter 140a having a thickness of about 2.5 mm and color filter 140b having a thickness of about 1.5 mm. The resulting color emitted at peak intensities of the yellow-green LED 132d through each of the color filters 140a and 140b fell within the yellow color boundaries defined by SAE J578.

Figure 10:
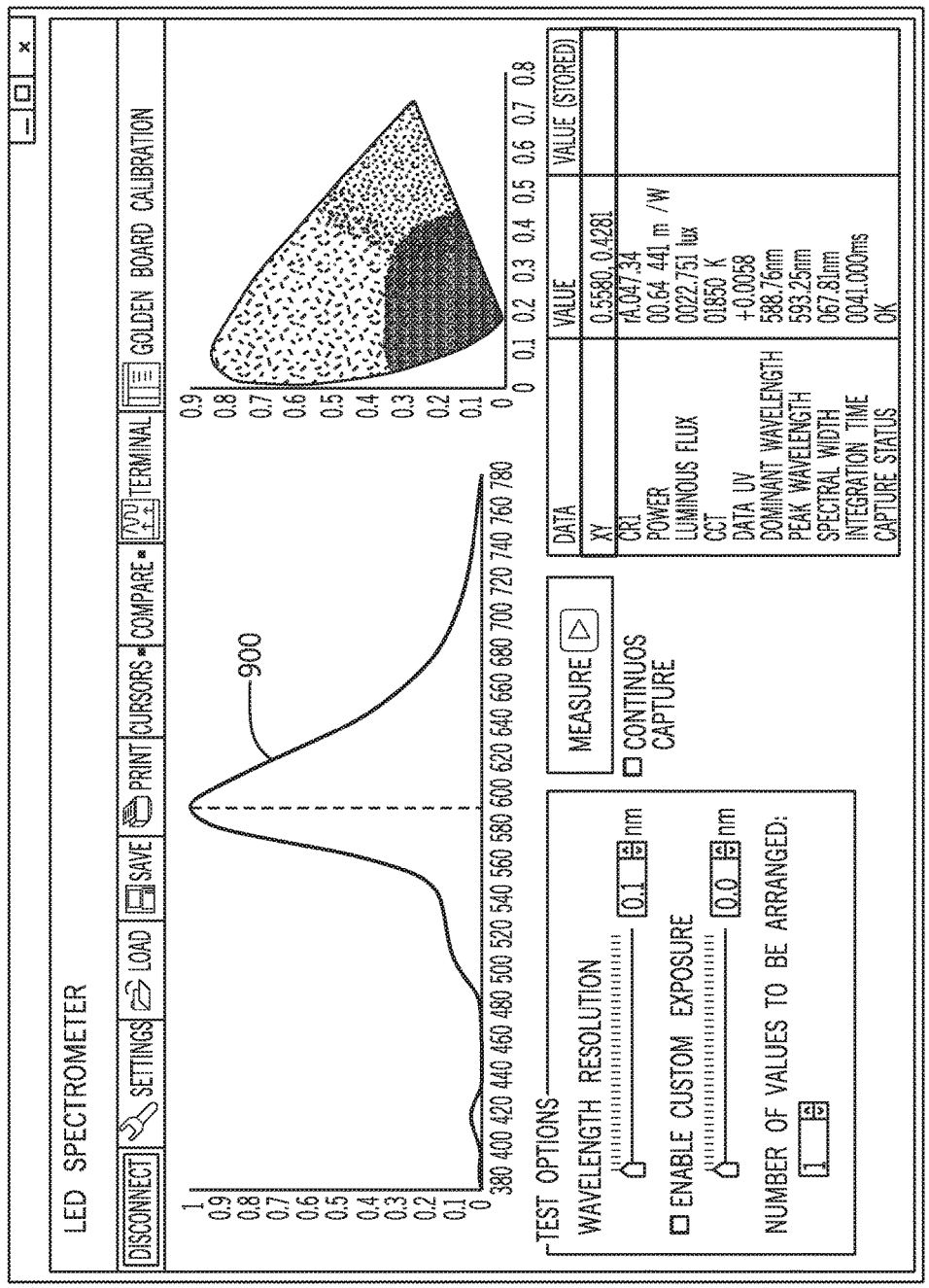
FIG. 10 illustrates an example measurement taken from a spectrophotometer of a yellow-green colored light source transmitted through a single-color optical filter according to an exemplary embodiment.

FIG. 10 illustrates a spectrophotometric measurement of an exemplary lighting assembly including a yellow-green colored InGaN LED as a turn signal light source, and a single-color optical filter having a thickness of 2.5 mm as a lens, according to an exemplary embodiment. As shown in FIG. 10, the resultant color plot 900 measured through the lens at a peak intensity of the yellow-green colored LED had a peak wavelength of about 593 nm and a dominant wavelength of about 589 nm, which falls within the yellow color boundaries defined by SAE J578.

According to an exemplary embodiment, the lenses 140, 241, 242a, and 243a are made (e.g., molded, extruded, etc.) from a polymeric material such as PMMA, polycarbonate, or any other polymeric material or combinations of materials suitable to function as a single-color optical filter in the taillight assemblies 100 and 200. According to an exemplary embodiment, the material of the lens is an acrylic molding resin (PMMA) such as Plexiglas® V825 18292 or V826 28247 available from Altuglas International of the Arkema Group, headquartered at 100 PA Route 413, Bristol, Pa. 19007, USA. According to an exemplary embodiment, the lens has a thickness in a range of about 0.09 mm to about 3.5 mm. According to other exemplary embodiments, the lens has a thickness in a range of about 1.5 mm to about 2.5 mm. According to other exemplary embodiments, the lens could have a different thickness depending on the desired application. The lens can have a single color, such as red, that complies with the automotive material requirements for taillight lenses set forth in SAE J576. In this way, the lens is less costly to manufacture and therefore, can reduce the overall cost of the taillight assembly.

By using a single-color optical filter in combination with one or more yellow-green colored light sources, a more flexible and cost efficient design is achieved. In particular, the use of InGaN type yellow-green colored LEDs in the disclosed lighting assembly is particularly advantageous given their higher luminous intensity and better color stability as compared to direct yellow colored AlInGaP type LEDs. Furthermore, an InGaN type yellow-green colored LED is preferable to a phosphor converted yellow colored LED in the disclosed lighting assembly, because the emitted light from the phosphor converted yellow LED will fall outside of the yellow color boundaries defined by SAE J578 when passed through a red colored lens. In contrast, the disclosed lighting assembly includes a single-color optical filter, and one or more yellow-green colored light sources that cooperate to meet both the requirements for yellow and red colored light emitted through the lens. Thus, the disclosed lighting assembly can be used for producing red tail lights, red brake lights, and yellow turn signals/hazards that each meet the respective requirements defined by SAE J578 and SAE J576.

According to various exemplary embodiments, the controller 150 can include a processing circuit having a central processing unit (CPU) and a memory. The CPU can be implemented as a passive circuit, a general purpose processor, an application specific integrated circuit (ASIC), one or more field programmable gate arrays (FPGAs), a group of processing components, or other suitable electronic processing components. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory may be or include volatile memory or non-volatile memory, and may include database components, object code components, script components, or any other type of information structure for supporting the various activities and information structures described in the present application. According to an exemplary embodiment, the memory is communicably connected to the CPU via the processing circuit and includes computer code for executing (e.g., by the processing circuit and/or the CPU) one or more processes described herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein.

What is claimed is:

1. A vehicle lighting assembly, comprising: a housing; a circuit board disposed within the housing and including a turn signal light source configured to emit yellow-green colored light at a peak intensity in a range of about 500 nm to about 570 nm; and a lens coupled to the housing, wherein the lens is a single-color optical filter configured to shift the yellow-green colored light emitted from the turn signal light source to a range of about 588 nm to about 592 nm, further comprising a brake light source coupled to the circuit board and configured to emit red colored light at a peak intensity in a range of about 612 nm to about 630 nm; wherein the lens is configured to allow the red colored light emitted from the brake light source to pass through the lens without a substantial shift in color.

2. The assembly of claim 1, wherein the lens is made from a polymeric material.

3. The assembly of claim 1, wherein the lens has a thickness in a range of about 0.09 mm to about 3.5 mm.

4. The assembly of claim 1, wherein the lens has a thickness in a range of about 1.5 mm to about 2.5 mm.

5. The assembly of claim 1, wherein the turn signal light source is an InGaN LED.

6. The assembly of claim 1, wherein the lens is an inner lens and the assembly further comprises an outer lens disposed over the inner lens, wherein the outer lens is substantially transparent.

7. The assembly of claim 1, further comprising a controller operatively coupled to the circuit board and the turn signal light source, wherein the controller is configured to be operatively coupled to a vehicle controller to control the turn signal light source.

8. A method of illuminating a vehicle lighting assembly, comprising: emitting yellow-green colored light at a peak intensity in a range of about 500 nm to about 570 nm from a turn signal light source coupled to a circuit board of the vehicle lighting assembly; and filtering the yellow-green colored light through a single-color optical filter to shift the yellow-green colored light emitted from the turn signal light source to a range of about 588 nm to about 592 nm, further comprising emitting red colored light at a peak intensity in a range of about 612 nm to about 630 nm from a brake light source coupled to the circuit board; wherein the single-color optical filter is configured to allow the red colored light emitted from the brake light source to pass through the lens without a substantial shift in color.

9. The method of claim 8, wherein the single-color optical filter is made from a polymeric material.

10. The method of claim 8, wherein the single-color optical filter has a thickness in a range of about 0.09 mm to about 3.5 mm.

11. The method of claim 8, wherein the single-color optical filter has a thickness in a range of about 1.5 mm to about 2.5 mm.

12. The method of claim 8, wherein the turn signal light source is an InGaN LED.

13. A vehicle taillight assembly, comprising:
a housing;
a circuit board disposed within the housing, the circuit board including a turn signal light source configured to emit yellow-green colored light at a peak intensity in a range of about 500 nm to about 570 nm and a brake light source configured to emit red colored light at a peak intensity in a range of about 612 nm to about 630 nm; and
a single-color optical filter coupled to the housing and configured to shift the yellow-green colored light emitted from the turn signal light source to a range of about 588 nm to about 592 nm through the filter and allow the red colored light emitted from the brake light source to pass through the filter without a substantial shift in color.

14. The assembly of claim 13, wherein the single-color optical filter is made from a polymeric material.

15. The assembly of claim 13, wherein the single-color optical filter has a thickness in a range of about 0.09 mm to about 3.5 mm.

16. The assembly of claim 13, wherein the single-color optical filter has a thickness in a range of about 1.5 mm to about 2.5 mm.

17. The assembly of claim 13, wherein the turn signal light source is an InGaN LED.

18. The assembly of claim 13, wherein the single-color optical filter is an inner lens and the assembly further comprises an outer lens disposed over the inner lens, wherein the outer lens is substantially transparent.

* * * * *